United States Patent
Maier et al.

(10) Patent No.: US 12,138,571 B2
(45) Date of Patent: Nov. 12, 2024

(54) SEAL ARRANGEMENT FOR A FILTER, IN PARTICULAR A COMPRESSED AIR FILTER, AND FILTER ELEMENT FOR A FILTER

(71) Applicant: SATA GmbH & Co. KG, Kornwestheim (DE)

(72) Inventors: Norbert Maier, Allmersbach i.T. (DE); Martin Horstman, Stuttgart (DE); Sven Schulze, Gemmrigheim (DE)

(73) Assignee: SATA GmbH & Co. KG, Kornwestheim (DE)

( * ) Notice: Subject to any disclaimer, the term of this patent is extended or adjusted under 35 U.S.C. 154(b) by 264 days.

(21) Appl. No.: 17/763,530

(22) PCT Filed: Sep. 9, 2020

(86) PCT No.: PCT/EP2020/075188
§ 371 (c)(1),
(2) Date: Mar. 24, 2022

(87) PCT Pub. No.: WO2021/058281
PCT Pub. Date: Apr. 1, 2021

(65) Prior Publication Data
US 2022/0347616 A1   Nov. 3, 2022

(30) Foreign Application Priority Data
Sep. 25, 2019   (DE) .................. 20 2019 105 324.0

(51) Int. Cl.
*B01D 46/24* (2006.01)
(52) U.S. Cl.
CPC .... *B01D 46/2414* (2013.01); *B01D 2201/342* (2013.01); *B01D 2271/022* (2013.01)
(58) Field of Classification Search
CPC .......... B01D 46/2414; B01D 2271/022; B01D 2201/295; B01D 2201/342;
(Continued)

(56) References Cited

U.S. PATENT DOCUMENTS

| D51,386 S | 10/1917 | King |
| 2,297,285 A | 9/1942 | Bledsoe |

(Continued)

FOREIGN PATENT DOCUMENTS

| CN | 101616723 A | 12/2009 |
| CN | 102029085 A | 4/2011 |

(Continued)

OTHER PUBLICATIONS

International Search Report and Written Opinion for PCT/EP2020/075188 filed Sep. 9, 2020.

(Continued)

*Primary Examiner* — Robert Clemente
(74) *Attorney, Agent, or Firm* — Paul D. Bianco; Stephen Bongini; Fleit Intellectual Property Law (57) ABSTRACT

A seal arrangement for a filter for fluid-tight sealing between a filter element and a filter head includes an annular elastic seal, a filter head sealing face and a filter element sealing face. The seal has a filter head side facing the filter head sealing face, a filter element side facing the filter element sealing face, an inner face running circumferentially on the inner side, and an outer face running circumferentially on the lateral side. The filter head side has a circumferential first recess between the inner and outer faces. The filter element side has a circumferential second recess between the inner and outer faces. The seal arrangement is configured in such a way that the seal, when subjected to a pressure from the inner face and/or from the outer face, is wedged in the direction of the acting force, between part faces of the sealing faces that narrow toward the middle.

20 Claims, 8 Drawing Sheets

(58) Field of Classification Search
CPC .... B01D 2201/4015; B01D 2201/4076; B01D 29/114
See application file for complete search history.

(56) References Cited

U.S. PATENT DOCUMENTS

| | | |
|---|---|---|
| D204,588 S | 5/1966 | Laub |
| 3,598,243 A | 8/1971 | Gutkowski |
| 3,727,333 A | 4/1973 | Ward |
| 3,745,965 A | 7/1973 | Lyung |
| 4,192,750 A | 3/1980 | Elfes |
| 4,615,800 A | 10/1986 | Stifelman |
| 4,818,385 A | 4/1989 | Medley |
| D306,754 S | 3/1990 | Petrucci |
| 5,325,707 A | 7/1994 | Slater |
| D388,468 S | 12/1997 | Rife |
| D393,490 S | 4/1998 | Burch |
| 5,876,610 A | 3/1999 | Clack |
| 6,224,751 B1 | 5/2001 | Hofmann et al. |
| D454,615 S | 3/2002 | Neal |
| 6,387,156 B1 | 5/2002 | Richardson |
| 6,467,481 B1 | 10/2002 | Eswarappa |
| 6,843,377 B1 | 1/2005 | Roll |
| D507,871 S | 8/2005 | DiMarchi |
| 7,232,253 B2 | 6/2007 | Isbitsky et al. |
| D547,826 S | 7/2007 | Kennedy |
| D547,827 S | 7/2007 | Kennedy |
| 7,563,299 B2 | 7/2009 | Baptista de Costa |
| D621,001 S | 8/2010 | Maziel |
| 7,882,961 B2 | 2/2011 | Filtration |
| 7,896,959 B1 | 3/2011 | Schopf |
| 7,909,999 B2 | 3/2011 | Noh |
| 8,021,618 B1 | 9/2011 | Cooper |
| 8,096,423 B2 | 1/2012 | Menez |
| D658,233 S | 4/2012 | Byford |
| 8,147,576 B2 | 4/2012 | Gillenberg |
| 8,268,170 B2 | 9/2012 | Core |
| 8,365,924 B2 | 2/2013 | Solkolchik |
| 8,440,081 B2 | 5/2013 | Wieczorek |
| 8,474,631 B2 | 7/2013 | Kocksch |
| 8,524,079 B1 | 9/2013 | Tseng |
| 8,920,530 B2 | 12/2014 | Ruhland et al. |
| 9,108,131 B2 | 8/2015 | Thalmann |
| 9,212,635 B2 | 12/2015 | Von Merkatz |
| 9,314,138 B2 | 4/2016 | Conrad |
| D760,321 S | 6/2016 | Kruse |
| D768,812 S | 8/2016 | Kruse |
| D792,554 S | 7/2017 | Kruse |
| D793,524 S | 8/2017 | Kruse |
| D794,752 S | 8/2017 | Kruse |
| 10,118,117 B2 | 11/2018 | Schwartz |
| 10,124,284 B2 | 11/2018 | Kruse |
| 10,625,184 B2 | 4/2020 | Stamey, Jr. |
| 10,737,208 B2 | 8/2020 | Schwartz |
| 11,318,398 B2 | 5/2022 | Stamey, Jr. |
| 2002/0029733 A1 | 3/2002 | Timmons |
| 2002/0174774 A1 | 11/2002 | Chen |
| 2004/0025880 A1 | 1/2004 | Capon |
| 2004/0201485 A1 | 10/2004 | Dermody |
| 2004/0240324 A1 | 12/2004 | Isbitsky et al. |
| 2005/0035036 A1 | 2/2005 | Moretto |
| 2005/0160911 A1 | 7/2005 | Friday |
| 2005/0229561 A1 | 10/2005 | Nepsund |
| 2006/0144766 A1 | 7/2006 | Felmeri et al. |
| 2007/0023333 A1 | 2/2007 | Mouhebaty |
| 2007/0079589 A1 | 4/2007 | Elkstrom |
| 2007/0095744 A1 | 5/2007 | Bagci |
| 2008/0047132 A1 | 2/2008 | Wieczorek |
| 2008/0060975 A1 | 3/2008 | Young |
| 2010/0294274 A1 | 11/2010 | Poirier |
| 2011/0132816 A1 | 6/2011 | Vasilescu |
| 2014/0077949 A1 | 3/2014 | Brinkley |
| 2014/0124459 A1 | 5/2014 | Li |
| 2014/0144111 A1 | 5/2014 | Campbell |
| 2014/0237763 A1 | 7/2014 | Holsten |
| 2015/0273381 A1 | 10/2015 | Stoner |
| 2016/0023152 A1 | 1/2016 | Kruse |
| 2017/0120168 A1 | 5/2017 | Stamey |
| 2018/0214803 A1 | 8/2018 | Li |
| 2019/0168141 A1 | 6/2019 | Yoshimura |
| 2022/0370944 A1 | 11/2022 | Maier |

FOREIGN PATENT DOCUMENTS

| | | |
|---|---|---|
| CN | 102089057 A | 6/2011 |
| CN | 103154491 A | 6/2013 |
| CN | 103534446 A | 1/2014 |
| CN | 105263600 A | 1/2016 |
| CN | 205517053 U | 8/2016 |
| CN | 106948983 A | 7/2017 |
| DE | 19819098 A1 | 11/1999 |
| DE | 10297296 T5 | 9/2004 |
| DE | 202007014822 U1 | 2/2009 |
| DE | 112007001879 T5 | 9/2009 |
| DE | 102008046499 A1 | 3/2010 |
| DE | 102009008450 A1 | 8/2010 |
| DE | 102013003304 A1 | 10/2013 |
| DE | 102018001635 A1 | 9/2019 |
| EP | 0858825 A1 | 8/1998 |
| EP | 1 405 145 B1 | 4/2004 |
| EP | 1405145 | 4/2004 |
| EP | 2 604 154 A1 | 6/2013 |
| WO | 02/00552 A2 | 1/2002 |
| WO | 03/007088 | 1/2003 |
| WO | 2003/007088 A2 | 1/2003 |
| WO | 2010/04315 A2 | 1/2010 |
| WO | 2012/150506 A2 | 11/2012 |
| WO | 2012/151749 A1 | 11/2012 |
| WO | 2014/057323 A1 | 4/2014 |
| WO | 2019/166599 A1 | 9/2019 |
| WO | 2021/058282 A1 | 4/2021 |

OTHER PUBLICATIONS

European Office Action dated Jul. 20, 2023, for European Patent Application No. 20 771 265.4-1101.
International Preliminary Report on Patentability with Written Opinion dated Mar. 15, 2022 for PCT/EP2020/075188.
International Preliminary Report on Patentability with Written Opinion dated Mar. 15, 2022, for PCT/EP2020/75203.
International Search Report and Written Opinion for PCT/EP2020/75203, filed Sep. 9, 2020.
For Chinese Patent Application No. 202080067071.7: Search Report dated Sep. 24, 2023 Office Action dated Sep. 26, 2023.
European Office Action dated Jul. 21, 2023, for European Application No. 20 771 521.0.
Office Action dated Sep. 27, 2017, from U.S. Appl. No. 14/807,933.
Notice of Allowance dated Aug. 29, 2018, from U.S. Appl. No. 14/807,933.
For Chinese Application No. 2020800670543: First Office Action dated Feb. 11, 2023 Search Report dated Feb. 11, 2023.
German Search Report dated Feb. 22, 2016 for Application No. 20 2015 005 244.4.

SEAL ARRANGEMENT FOR A FILTER, IN PARTICULAR A COMPRESSED AIR FILTER, AND FILTER ELEMENT FOR A FILTER

FIELD OF THE INVENTION

The invention relates to a seal arrangement for a filter, in particular a compressed air filter, in particular as part of a system having a plurality of filter stages, for the fluid-tight sealing between a filter element, in particular a filter cartridge, and a filter head, comprising an annular, elastic sealing member, the sealing member having a filter head side that faces the filter head, an opposite filter element side, an internal face encircling the inside and an opposite external face encircling the shell face, wherein the filter head side has an encircling first concavity between the internal face and the external face, wherein the filter element side has an encircling second concavity between the internal face and the external face.

Furthermore, the invention relates to a filter element for a filter.

BACKGROUND

Filters typically have a filter element which is fastened directly or indirectly to a filter head. A seal arrangement is used for the sealing between the filter element and the filter head. The seal arrangement here seals by way of an annular sealing member which bears on a sealing face proximal to the filter head as well as proximal to the filter element. Since filter elements are generally removable or exchangeable, respectively, sealing members of this type are typically fastened to the filter element in order to be exchanged conjointly with the filter element. Standard sealing members such as, for example, O-rings are in most instances used in such seal arrangements. However, more complex sealing members are also known to meet special requirements. Typically, such seal arrangements are designed in such a manner that they seal predominantly in the radial direction on the circumference. In isolated cases, however, complex sealing members are also known, some of the latter sealing in the axial direction.

An axially directed seal arrangement mentioned at the outset is known from DE 11 2007 001 879 T5. This is a quick drain filter which has a seal arrangement with a sealing member with a concavity proximal to the filter head and proximal to the filter element, the sealing member sealing between a filter element and a filter head. Here, the internal circumference of the sealing member bears on a standpipe fastened to the filter head and by way of the outer circumference bears on the filter head per se, wherein the sealing member is fastened to the filter element. The seal is conceived for sliding along the standpipe when the filter element is being inserted, so as to remove debris from the standpipe.

SUMMARY

One aspect of the invention relates to an axially sealing seal arrangement which is characterized by high functional reliability.

Advantageous design embodiments are disclosed herein.

The seal arrangement according to the invention for a filter can be used in particular in the field of compressed air filters, for example as part of a system having a plurality of filter stages, for the fluid-tight sealing between a filter element and a filter head. Such a filter element is preferably a filter cartridge. The sealing assembly comprises an annular elastic sealing member, a filter head and filter element sealing face. The sealing member has a filter head side that faces the filter head sealing face, an opposite filter element side that faces the filter element sealing face, an internal face encircling the inside and an opposite external face encircling the shell face. The filter head side comprises an encircling first concavity between the internal face and the external face, wherein the filter element side has an encircling second concavity between the internal face and the external face. The filter head side, at least in regions, bears in an encircling manner on the filter head sealing face, wherein the filter element side, at least in regions, bears in an encircling manner on the filter element sealing face. The filter head sealing face and the filter element sealing face are composed of at least one encircling inner partial face and one encircling outer partial face.

As disclosed herein, an axially sealing seal arrangement which is characterized by high functional reliability can be achieved in that the partial faces of the filter head sealing face and the partial faces of the filter element sealing face ascend toward the center between the partial faces in such a manner that the mutual spacing between the inner partial faces decreases from the inside to the outside and the spacing between the outer partial faces decreases from the outside to the inside, substantially in the direction of the central axis of the sealing member. The partial faces interact with the concavities in such a manner that, when impinged with pressure, the sealing member, proceeding from the internal face and/or the external face, in the direction of the acting force is wedged between the inner partial faces and/or the outer partial faces.

The description of the seal arrangement, as well as the subsequent description of a filter element, is always based on the assembled state with a compressed sealing member. In this state, the sealing member seals between an internal space and an external space. Should an embodiment relate to the disassembled state with a non-compressed sealing member, this will be explicitly mentioned.

As a result of the partial faces ascending toward the center, a central constriction is created between the filter head sealing face and the filter element sealing face, which from the center between the two partial faces expands outwards on both sides. This constriction interacts with a corresponding taper of the sealing member. If the sealing member is impinged with pressure from the internal face or the external face, the former is pressed against the oblique flanks of the constriction that are situated on the side of the applied force. The sealing member herein is so inflexible that, when used as intended, it cannot be compressed so much by the applied pressure that the sealing member in the direction of the force is squeezed through the constriction.

As a result of the sealing member being pressed into the constriction, wedging or a greater compression of the sealing member between the opposite sealing faces results, this in turn leading to an increase in the sealing effect. This occurs both in the case of a resultant impingement with pressure on the part of the external circumferential face as well as on the part of the internal circumferential face.

The sealing effect increases in a self-acting manner when the load from the internal face or the external face increases.

In particular, the seal seat between the partial faces and the concavities is reinforced when there is a pressure differential between the internal face and the external face as a result of the interaction between the acting force and the wedge effect. If, due to a pressure differential on the internal or external face of the sealing member, greater pressure is exerted on the sealing member than on the opposite face, the sealing member is pressed in the direction of the applied force, wherein the space between the partial faces is decreased in this direction. The wedge effect results from the interaction between the acting force and the constriction between the filter head sealing face and the filter element sealing face. As a result of the wedge effect, the seal is increasingly pressed against these partial faces, whereby the sealing effect increases as the pressure difference increases.

Moreover, the ramp-type design makes it easier to position the seal or the filter element relative to the filter head.

It is particularly advantageous if the sealing member on the filter head side has an encircling retaining groove for receiving a retaining element. In particular, the retaining element is designed in such a manner that, when interacting with the retaining groove, a releasable latching connection is created, wherein the latching connection holds the filter head side of the sealing member so as to bear on the filter head sealing face. The retaining groove runs here in the region of the concavity, preferably in the base of the first concavity. The retaining element projects between the two partial faces of the filter head sealing face. The retaining element preferably projects in relation to the filter head sealing face along a circular ring. As a result of a latching connection of this type, the sealing member can be reliably held on the filter head, wherein a replacement of the sealing member, for example in the event of damage, is particularly facilitated.

It is also particularly advantageous if the second concavity extends at least over half, preferably more than two thirds, of the width of the filter element side between the internal face and the external face. Additionally, the first concavity can also extend at least over half, preferably more than two thirds, of the width of the side of the filter head between the internal face and the external face. A particularly good seal seat can be guaranteed by a design embodiment of this type, because two circular sealing lines with narrow (almost linear) faces are produced and any potential surface pressure is thus prevented.

It is therefore also particularly advantageous if the sealing member in an encircling sub-region of the second concavity, preferably in the region of the lowest point of the second concavity, does not bear on the filter element sealing face. It is of particular advantage if the sealing member in the region that is closest to the filter head sealing face, at least in regions, does not bear on the sealing member. Thus, a first outer and a second inner sealing face can be created, which have similar sealing properties, as a result of which it is guaranteed that the seal can withstand comparable loads on both sides.

The retaining element and the retaining groove can be designed in such a manner that there is a sealing seat between the base of the retaining groove and the region of the retaining element that is closest to the filter element sealing face. This is preferably achieved in that the depth of the retaining groove in the axial direction in non-assembled state of the sealing member is smaller than the height of the retaining element in the axial direction. This makes it possible to generate an annular seal with a small face which seals in a fluid-tight manner even in the event of a weak compression of the sealing member.

The latching connection can be formed by a unilateral extension on the retaining element and a corresponding recess in the sealing member, wherein the widening in the radial direction projects outwards, toward a central axis of the sealing member. The opposite side of the retaining element here has no convexity and in the direction of the central axis is planar. Thus, the retaining element is substantially L-shaped in cross section. A retaining element designed in such a manner guarantees that the service life of the sealing member is maximized, since the retaining groove is only stressed on the outside.

It is particularly advantageous if the sealing member has a hardness between 60 Shore A and 80 Shore A, preferably 70 Shore A. It is guaranteed as a result that the sealing member is sufficiently elastic in order to provide adequate sealing between the sealing faces and at the same time is stiff enough to ensure the wedge effect to the extent required.

It is likewise advantageous if partial faces of the filter head sealing face and/or of the filter element sealing face in the radial direction toward the central axis are at a mutual internal angle $\alpha$ of less than 180°, preferably between 130° and 170°. A particularly advantageous range is between 145° and 155°. A particularly advantageous distribution of the acting forces and the creation of the wedge effect can be guaranteed by these angles.

It is likewise particularly advantageous if the filter head side of the sealing member has two annular encircling partial sealing faces, the retaining groove therebetween extending into the sealing member, and both partial sealing faces in the radial direction to the central axis at an external angle $\alpha_1$ less than 180°, preferably between 125° and 175°. A particularly advantageous range here is between 140° and 150°. This guarantees an optimal interaction between the sealing faces proximal to the filter head and proximal to the partial sealing faces on the filter head side of the sealing member and thus a high sealing effect and the creation of the wedge effect.

It is likewise advantageous if in the non-assembled state the second concavity has a greater depth in the direction of the central axis than the height offset of the partial faces. The height offset of the partial face is to be understood here as the distance over which the partial faces in the axial direction counter to the filter head. The height of the partial faces is preferably less than 70% of the depth of the second concavity. As a result of the greater depth of the second concavity, a clearance which compensates for inaccuracies in the positioning of the two surfaces relative to one another is provided between the filter head sealing face and the filter element sealing face.

In a further particularly preferred exemplary embodiment, the seal arrangement is configured for use in a filter, the filter element of which to the filter head taking place along an assembly axis which runs parallel to, or is identical to, the central axis of the sealing member. This enables a particularly simple assembly and disassembly of the filter element.

It can likewise be of particular advantage if the seal arrangement is embodied in such a manner that the internal face and external face of the sealing member come to bear neither proximal to the filter head nor proximal to the filter element. Accordingly, the sealing member seals in relation to the filter head sealing face and in relation to the filter element sealing face substantially only by way of axially acting forces. Such an axially sealing seal likewise enables a particularly simple assembly and disassembly of the filter element, since a significantly smaller distance in the axial direction is necessary in order to achieve a sufficient sealing effect.

According to the above description of a seal arrangement, it can likewise be advantageous to provide a specially designed filter element for a filter, in particular a compressed air filter. This here can be a filter cartridge, for example. Such a filter element has a filter element sealing face according to a seal arrangement as per the above features. In particular, the filter element sealing face is composed of at least one encircling inner partial face and one encircling outer partial face, which ascend toward the center between the partial faces.

The filter element sealing face here can be set back in relation to an end side of the filter element and/or the end side can be formed by an encircling collar projecting in relation to the filter element sealing face. A safety device which prevents an expansion of the sealing member in the event of excessive stress on the internal face can be provided by an encircling collar.

A preferred filter element can be designed as an exchangeable filter element, in particular for separating particles and/or gases and/or liquids, in particular in the form of a filter cartridge, for use in a filter.

The filter element comprises a substantially tubular body having an annular end side that faces a filter head. Furthermore provided is a lower side which is spaced apart from the end side and faces away from the filter head.

The filter element moreover has an encircling face which extends along a central axis, in particular a rotation axis, and connects the end side and the lower side to one another. A plurality of, preferably three, particularly preferably four, holding arms which run radially toward the central axis are provided in the region of the end side. The annular filter element sealing face is provided on the end side, wherein the holding arms project in relation to the filter element sealing face. The holding arms here serve for positioning the filter element and as a mounting of the filter cartridge, which fixes the filter cartridge toward the filter head.

The holding arms can be substantially L-shaped in cross section. The holding arms can project outwards in the axial direction and/or in the radial direction in relation to the filter element sealing face. It can also be advantageous if the holding arms project radially outwards on the circumferential face. A particularly advantageous fastening of the filter element toward the filter head can be provided by holding arms designed in this manner.

The holding arms are preferably fixedly connected to the filter element sealing face, preferably configured so as to be integral to the filter element sealing face. Other elements can also be involved here. This enables the position of the holding arms in relation to the filter element sealing face to be established, which ultimately enables optimal positioning of the filter element in relation to the rest of the filter.

It is particularly advantageous here if the holding arms each have a support face which points in the opposite direction of the filter element sealing face, preferably wherein the support face is convexly curved. The convex curvature of the support surface runs in the axial direction, wherein the support faces adjoin the free ends of the holding arms and in the radial direction have a length of at least 3 millimeters and at most 10 millimeters. A particularly advantageous transmission of force between the holding arms and the filter element sealing face is enabled as a result. Furthermore, receiving the holding arms in a corresponding receptacle device is facilitated.

Additionally, centering ramps can be provided at the transition between the holding arms and the circumferential face. The centering ramps in the direction of the holding arms here extend at an angle of between 5° and 70°, preferably between 20° and 40°, in relation to the central axis of the circumferential face. The centering ramps here connect the circumferential face and the support faces to one another. The positioning of the filter element relative to the filter head and in the filter sleeve is facilitated, or said filter element is centered in the filter sleeve and kept at a spacing from the latter, by the centering ramps.

The holdings arms may also have an end face which is situated at the exposed end of the holding arms that in the radial direction faces away from the circumferential face. The spacing between the center of the filter element sealing face and the end face is preferably between 12 and 18 millimeters in the radial direction, wherein the spacing from the center of the filter element sealing face can also be between 14 and 16 millimeters. The smallest distance in the axial direction between the filter element sealing face and the support faces is between 0 and 4 millimeters, preferably between 1 and 2 millimeters. The largest distance between the filter element sealing face and the support faces is between 4 and 6 millimeters. A particularly stable fit of the holding arms in a corresponding clearance is guaranteed as a result of these dimensions.

Furthermore, the filter element can be designed in such a manner that substantially only axial forces act on the filter element sealing face, preferably wherein the holding arms form a counterbearing in relation to the axial forces. Here, the axial forces are created as a result of the compression of the sealing member which bears on the filter element sealing face. The holding arms can be flexible in the axial direction and serve as a compensating element between the sealing member and the receptacle installations for the holding arms.

Moreover, the sealing member bears on the annular filter element sealing face of the filter element in such a manner that the sealing member between the filter head and the filter element separates an external space which is located outside the filter element from an internal space which is located within the filter element. This results in the separation of a clean gas space from a raw gas space and achieves a particularly advantageous connection between the filter element and the filter head.

As a further design feature, a substantially tubular filter sleeve can be provided with an open filter sleeve end side that faces the filter head and a filter sleeve external side that runs along the shell face, preferably wherein the filter sleeve surrounds the filter element and delimits the latter from the environment. Moreover, the end side of the filter sleeve can have receptacle installations for the holding arms, wherein the filter element is in contact with the filter sleeve only by way of the holding arms disposed in the receptacle installations and is otherwise designed to be freely suspended in the filter sleeve. Such a connection between the filter head, the filter cartridge and the filter sleeve can be implemented with a particularly small number of additional parts and using simple geometries and is therefore particularly cost-effective.

The receptacle installations can be formed at least by continuous incisions which begin at the end side of the filter sleeve and run radially to the central axis; the receptacle installations preferably receiving the holding arms. Inter alia, the ends of the incisions can form counterbearings which are concave in shape to match the convex support faces of the holding arms. The counterbearings absorb the forces that are created as a result of the compression and the pressure load on the sealing member. This interaction between receptacle installations and holding arms enables a particularly simple positioning of the filter element, wherein a compensation for dimensional deviations is simultaneously achieved in addition to the sealing member.

The sealing member can be an axially acting seal. Moreover, the filter sleeve can be sealed toward the filter head by means of a radial seal. In order to form a closed space around the filter element, the filter sleeve can be designed in the shape of a pot and accordingly be closed at the end that faces away from the filter head. On the one hand, this form of sealing enables simple assembly of the filter cartridge and, on the other hand, can be implemented in a particularly space-saving manner.

At least two of the receptacle installations can be designed as receptacle locking installations which are used to receive the holding arms and to receive retaining bolts. These retaining bolts are preferably attached to the filter head and can be aligned radially to the central axis. The receptacle locking devices are advantageously designed in such a manner that the retaining bolts interact with the receptacle locking devices in the manner of a bayonet closure. Such a configuration enables the filter element to be changed particularly easily, while at the same time enabling a sufficient axial movement for bracing the sealing member.

For the implementation of the bayonet closure, the receptacle locking devices can have, additionally to the axial incisions of the receptacle installations, a fastening extension, which is preferably formed by a further incision that starts from the axial incisions and runs substantially in the circumferential direction about parts of the filter sleeve. In addition, the attachment extensions can have a latching undercut, which is formed by a concavity in the end region of the attachment extensions proximal to the filter head. A bayonet closure designed in this manner can be manufactured in a particularly cost-effective manner and enables the filter sleeve to be particularly securely fastened to the filter head, this fastening being self-securing when pressure is applied to the filter through the latching undercut.

A further embodiment comprises a system having at least two of the filters described above, wherein the filter elements preferably have different filter properties. The seal arrangements for sealing between the filter elements and the filter heads are preferably of a substantially identical design. Additionally or alternatively, the receptacle installations of the filter sleeves and the holding arms of the filter elements can be of a substantially identical design.

In such a filter system, the seals between the filter element and filter head, as well as the sealing faces proximal to the filter element and the sealing faces proximal to the filter head, the receptacle installations of the filter sleeves or the holding arms of the filter elements of the different filter stages can be of an identical design.

A filter element of this type, or the seal arrangement between the filter element and filter head of this type, respectively, is designed so that the filter element or the seal arrangement can be subjected to higher pressure from the outside than from the inside. Preferably, at least one of the filter elements or one of the seal arrangements of the entire filter system is pressurized in reverse. As a result, a uniform construction of the different filter stages can be provided. Furthermore, with this construction, the filter elements can be loaded or passed through by a flow both from the outside in and from the inside out. One of the filter elements is preferably passed through by a flow in the radial direction from the inside to the outside, and another filter element from the outside to the inside, thus toward the central axis.

A filter head of a corresponding filter preferably has a hollow-cylindrical filter sleeve end side recess which extends from the side of the end side and so as to be substantially axially symmetrical to the central axis of the filter element into the filter head and receives the filter sleeve end side. Here, the filter sleeve end side recess in the radial direction to the central axis is located outside of the filter head sealing face. This enables a particularly compact construction mode.

Furthermore, a corresponding filter head can have two retaining bolt bores which run radially to the central axis and which preferably lie opposite one another, wherein the retaining bolt bores receive retaining bolts that are part of the bayonet closure. A metal-to-metal cone seal for sealing in relation to the environment is preferably provided between the retaining bolts and the filter head. This design enables particularly simple and cost-effective manufacturing.

A filter according to the invention may have only the main features or else any combination of the further features described. Furthermore, the various features of the exemplary embodiments can be combined with one another in an arbitrary manner, even among different exemplary embodiments. Besides, the invention relates to a filter having a described filter element as well as to a filter having a described seal arrangement, as well as to the seal arrangement and the filter element per se, or any arbitrary combination of filter element and seal arrangement, respectively.

BRIEF DESCRIPTION OF THE DRAWINGS

The invention will be explained hereunder with reference to the figures described below. In the figures.

DETAILED DESCRIPTION

Figure 1:
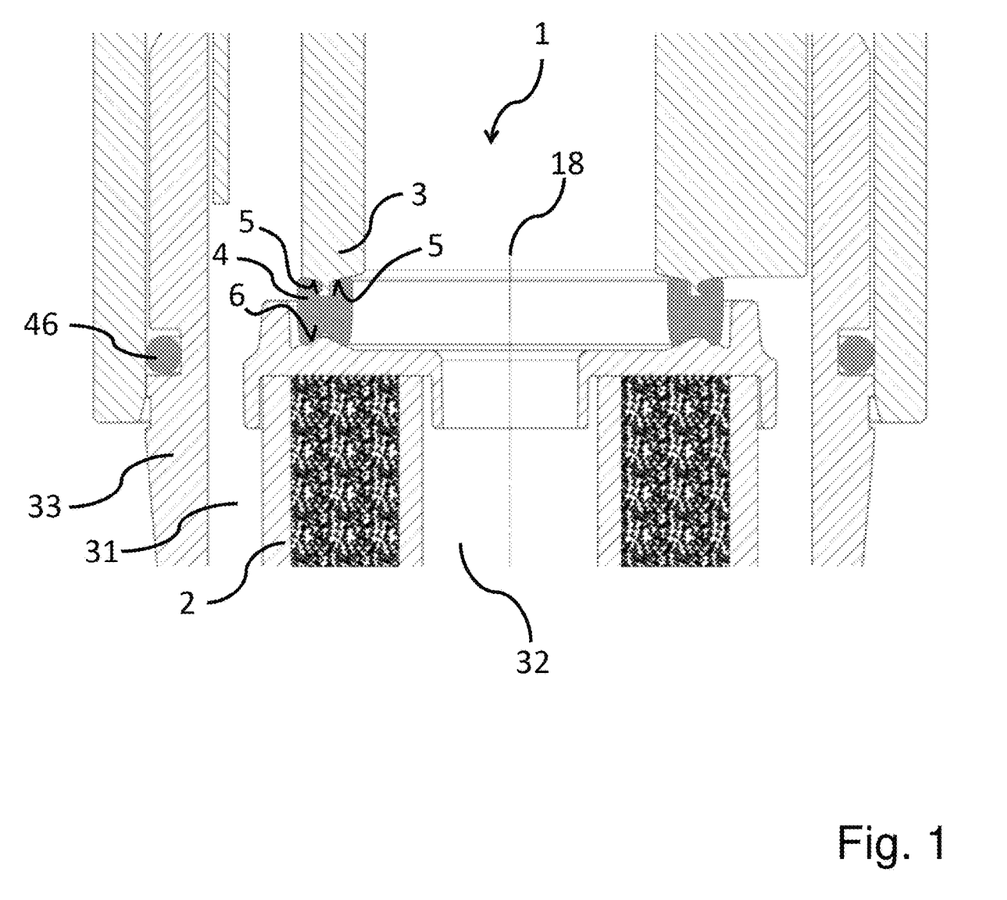
FIG. 1 shows a fragment of a sectional view of a filter stage having a seal arrangement and a filter element.
Figure 2:
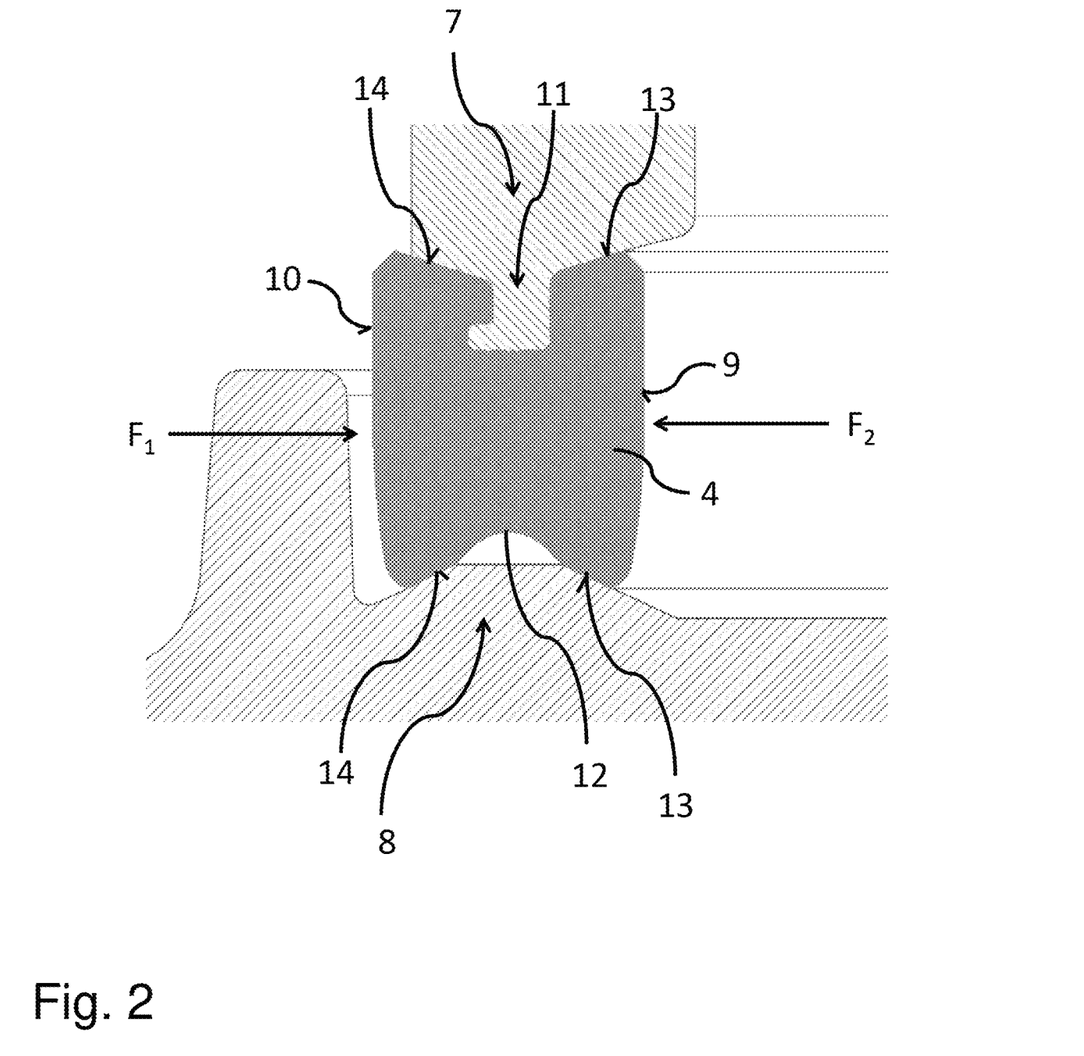
FIG. 2 shows a fragment of a sectional view of a seal arrangement.

Shown in FIGS. 1 and 2 is a seal arrangement 1 for a filter, in particular a compressed air filter, in particular as part of a system having a plurality of filter stages, for the fluid-tight sealing between a filter element 2, in particular a filter cartridge, and a filter head 3. An annular, elastic sealing member 4 and a filter head and filter element sealing face 5, 6 are furthermore shown.

The sealing member 4 has a filter head side 7 that faces the filter head sealing face 5, an opposite filter element side 8 that faces the filter element sealing face 6, an internal face 9 encircling the inside and an opposite external face 10 encircling the shell face. The filter head side 7 has an encircling first concavity 11 between the internal face 9 and the external face 10, wherein the filter element side 8 also has an encircling second concavity 12 between the internal face 9 and the external face 10.

The filter head sealing face 5 and the filter element sealing face 6 are composed of at least one encircling inner partial face 13 and one encircling outer partial face 14. It can be seen from the drawings that the filter head side 7, at least in regions, bears in an encircling manner on the filter head sealing face 5, and the filter element side 8, at least in certain regions, bears in an encircling manner on the filter element sealing face 6. The partial faces 13, 14 of the filter head sealing face 5 and the partial faces 13, 14 of the filter element sealing face 6 here ascend toward the center between the partial faces 13, 14 in such a manner that the mutual spacing between the inner partial faces 13 in the axial direction toward the central axis 18 decreases from the inside to the outside and the spacing of the outer partial faces 14 decreases from the outside to the inside. It can likewise be seen that the internal face 9 and external face 10 of the sealing member 4 come into contact neither proximal to the filter head nor proximal to the filter element and accordingly only seal axially in relation to the central axis 18.

Furthermore shown is a radial seal 46 which between the filter head 3 and the filter sleeve 33 seals the filter in relation to the environment. This seal 46 is a seal 46 which substantially seals forces acting radially to the central axis 18.

Figure 4:
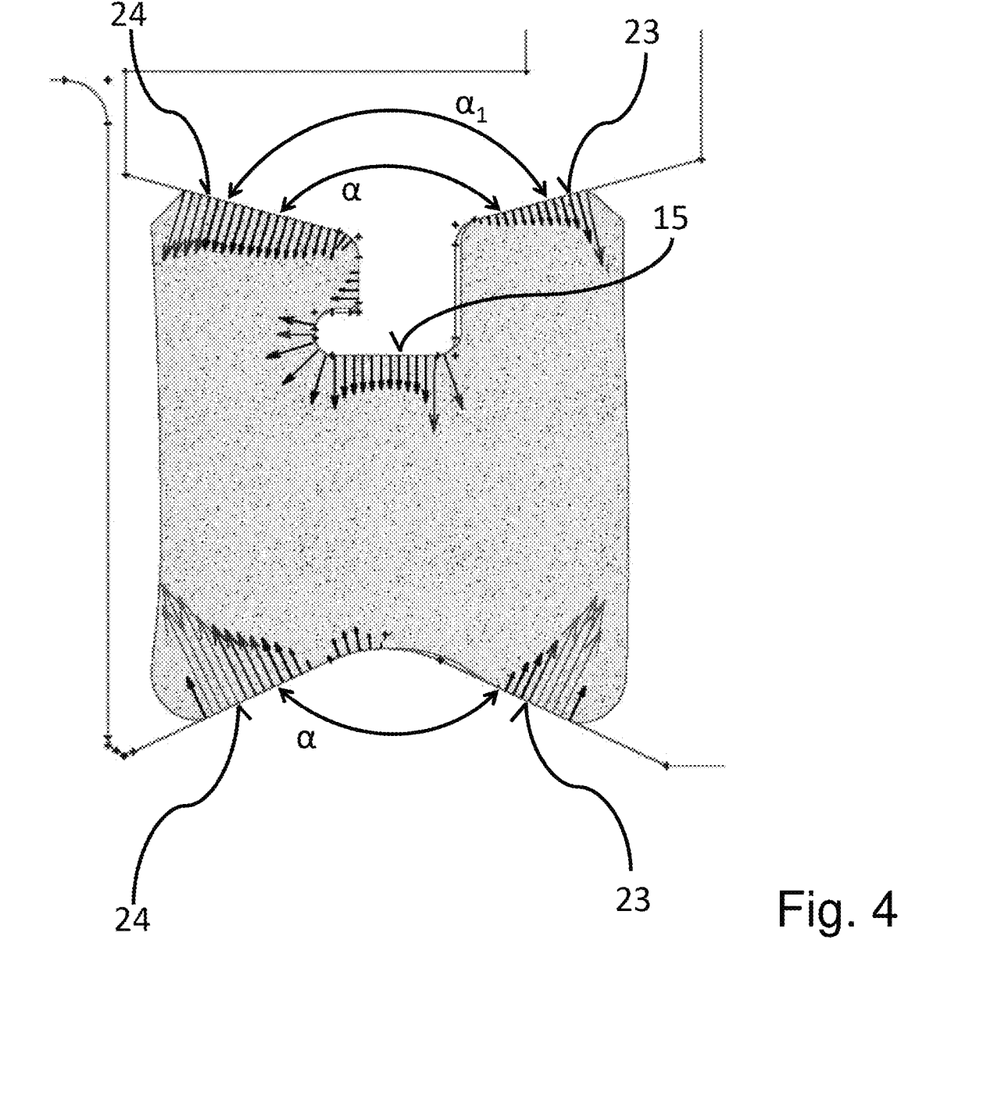
FIG. 4 shows a force action diagram of a sealing member stressed axially and circumferentially.

As can likewise be seen from FIGS. 1 and 2, the partial faces 13, 14 interact with the concavities 11, 12 in such a manner that, when impinged with pressure, the sealing member 4, proceeding from the internal face 9 and/or the external face 10, in the direction of the acting force $F_1$, $F_2$ is wedged between the inner partial faces 13 and/or the outer partial faces 14. As a result of this wedging effect, the sealing seat between the partial faces 13, 14 and the concavities 11, 12 is reinforced, wherein the acting force $F_1$, $F_2$ is created only when there is a pressure difference between the internal face 9 and the external face 10. Illustrated in FIG. 4 are the forces that act on the sealing faces 5, 6 when the seal arrangement 1 on the external face is stressed by an external face $F_1$.

As can also be derived from FIG. 1, the seal arrangement 1 is configured for use in a filter, wherein the assembly of the filter element 2 on the filter head 3 takes place along an assembly axis which runs so as to be identical to the central axis 18 of the sealing member 4.

The sealing member 4 bears on the annular filter element sealing face 6 of the filter element 2 and between the filter head 3 and the filter element 2 separates an external space 31, which is situated outside the filter element 2, from an internal space 32, which is situated inside the filter element 2.

Figure 3:
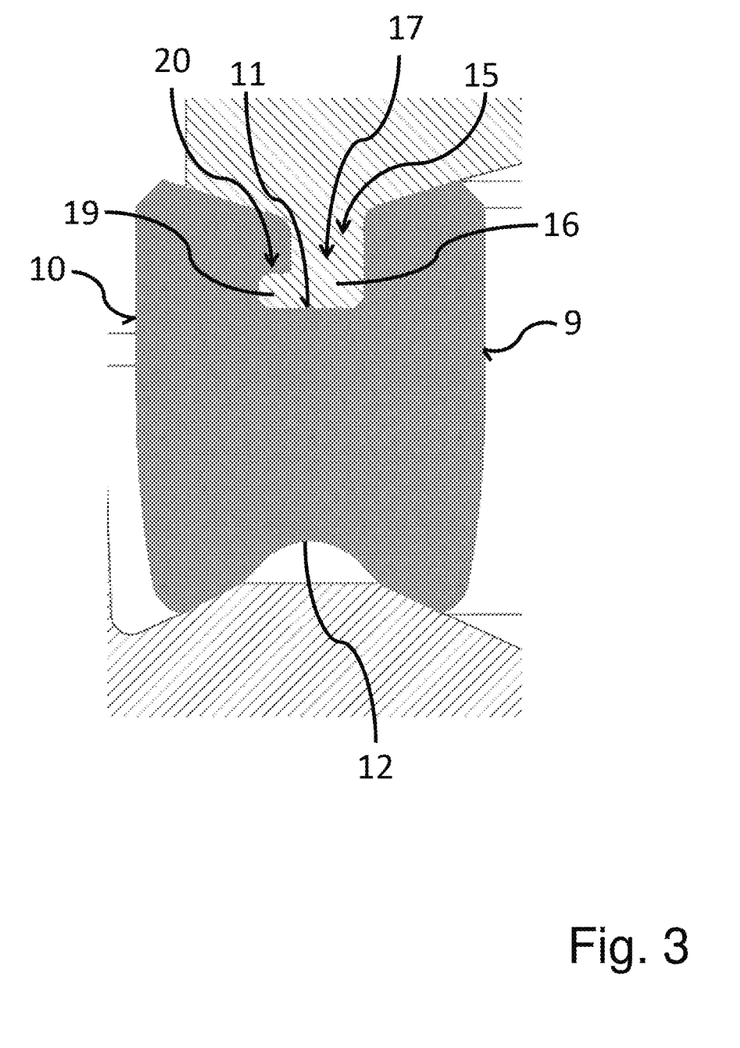
FIG. 3 shows an enlarged section of a sectional view of a seal arrangement.

In FIG. 3 it is shown that the sealing member 4 on the filter head side 7 has an encircling retaining groove 15 for receiving a retaining element 16. The retaining element 16 is designed in such a manner that, when interacting with the retaining groove 15, a releasable latching connection 17 is created. The latching connection 17 holds the filter head side 7 so as to bear on the filter head sealing face 5, wherein the retaining groove 15 runs in the region of the concavities 11, 12, preferably in the base of the first concavity 11. The retaining element 16 projects between the two partial faces 13, 14 of the filter head sealing face 5. In particular, the retaining element 16 projects in relation the filter head sealing face 5 along a circular ring.

The second concavity 12 extends at least over half, preferably more than two thirds, of the width of the filter element side 8 between the internal face 9 and the external face 10. The first concavity 11 extends at least over half, here over more than two thirds, of the width of the filter head side 7 between the internal face 9 and the external face 10.

In an encircling sub-region of the second concavity 12, which is preferably located in the region of the lowest point of the second concavity 12, the sealing member 4 does not bear on the filter element sealing face 6. As can be seen, the sealing member 4 does not bear in the region that is closest to the filter head sealing face 5.

As can likewise be seen from FIG. 3 as well as from FIG. 4, the retaining element 16 and the retaining groove 15 are designed in such a manner that there is a sealing seat between the base of the retaining groove 15 and the region of the retaining element 16 that is closest to the filter element sealing face 6. This is achieved in that the depth of the retaining groove 15 of the seal in the non-assembled state of the sealing member 4 is at least the size of the height of the retaining element 16 in the direction of the central axis 18, preferably less than the height of the retaining element 16.

It is furthermore shown that the latching connection 17 is formed by a unilateral extension 19 on the retaining element 16 and a corresponding recess 20 in the sealing member 4. The extension 19 in the radial direction projects outwards, toward a central axis 18 of the sealing member 4 shown in FIG. 1. The opposite side of the retaining element 16 has no convexity and in the direction of the central axis 18 is planar. The retaining element 16 is substantially L-shaped, this being shown in a mirror-inverted manner in FIG. 3.

The sealing member 4 shown moreover has a hardness between 60 Shore A and 80 Shore A, preferably 70 Shore A.

In FIG. 4 it is shown that the partial faces 13, 14 of the filter head sealing face 5 and of the filter element sealing face 6 in the radial direction toward the central axis 18 are at an internal angle α of less than 180°, preferably between 130° and 170°. Furthermore, the filter head side 5 of the sealing member 4 has two annular encircling partial sealing faces 23, 24, between which the retaining groove 15 extends into the sealing member 4. Both partial sealing faces 23, 24 in the radial direction to the central axis 18 have a mutual external angle $α_1$ of less than 180°, preferably between 125° and 175°.

Since the sealing member 4 is shown in FIG. 4 in the pressed state, it is obvious that in the non-assembled state the second concavity 12 has a greater depth in the direction of the central axis 18 than the partial faces 13, 14, toward the center between the two partial faces 13, 14 out, in the direction of the filter head 3 extend. For example, a shown compression of the sealing member 4 is achieved when the height of the partial faces 13, 14 is less than 70% of the depth of the second concavity 12.

As can be seen from the distribution of forces and the exposed inner and external faces 9, 10, the sealing member 4 is an axially acting seal which seals substantially only by way of axially acting forces.

Figure 5:
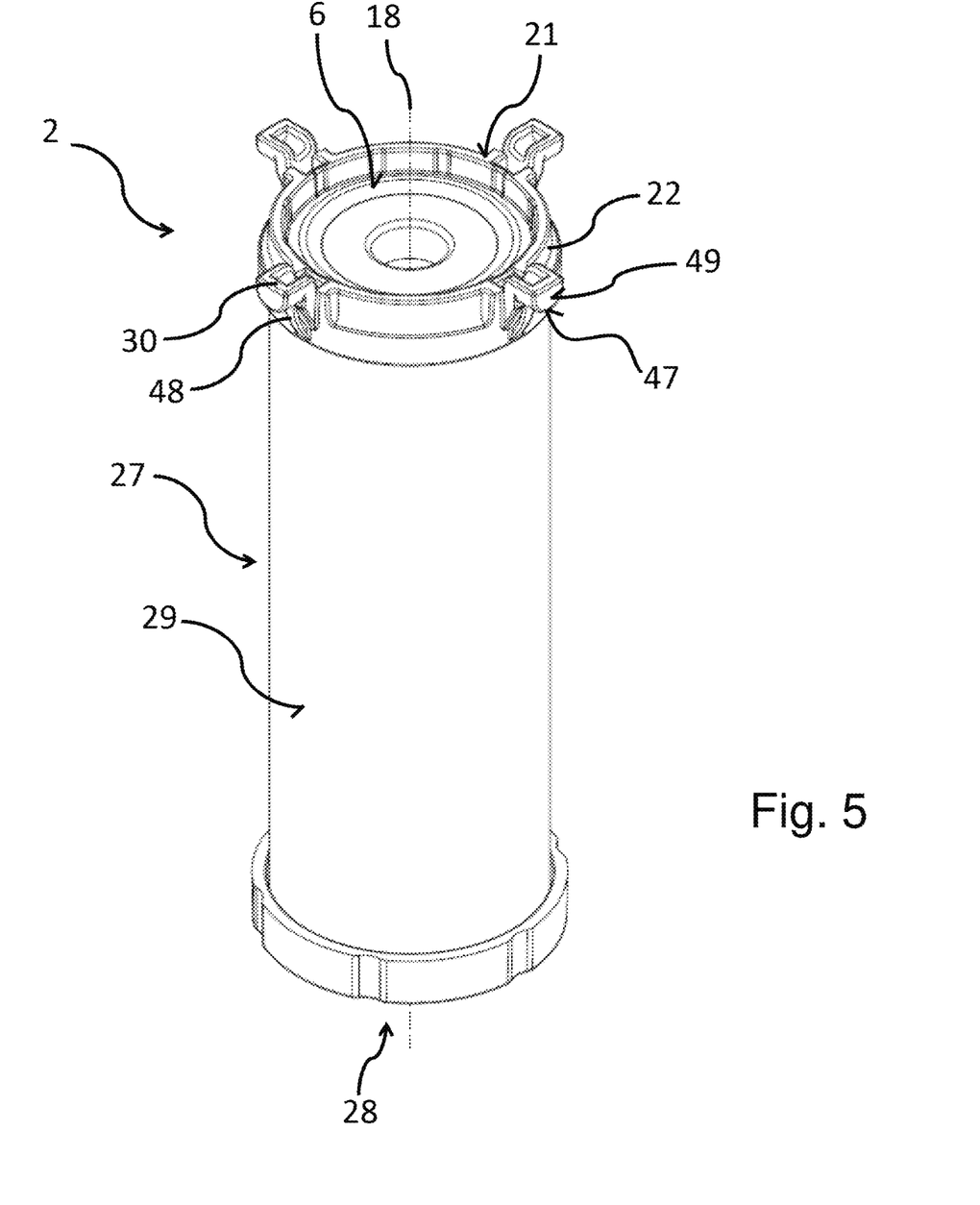
FIG. 5 shows a perspective view of a filter element.

Shown in FIG. 5 is a corresponding filter element 2 which is illustrated here as a filter cartridge. The filter element 2 has a filter element sealing face 6 which is set back from an end side 21 of the filter element 2. In other words, the end side 21 is formed by an encircling collar 22 that projects in relation to the filter element sealing face 6.

The filter element 2 shown is an exchangeable filter element 2 which can be used to separate particles and/or gases and/or liquids. In particular, this is a filter cartridge that can be conceived for use in a filter, in particular a compressed air filter. The filter may be part of a system having multiple filter stages.

The filter element 2 shown comprises an essentially tubular body 27 having an annular end side 21 that faces a filter head 3 shown, inter alia, in FIG. 1 and FIG. 2. Furthermore, the filter element 2 has a lower side 28 which is spaced apart from the end side 21 and faces away from the filter head 3. Moreover, the filter element 2 has a circumferential face 29 which extends along a central axis 18, in particular a rotation axis. As can be seen, the circumferential face 29 connects the end side 21 and the lower side 28 to one another. Furthermore shown in the region of the end side 21 are a plurality of, preferably three, particularly preferably four, holding arms 30 running radially to the central axis 18. On the end side 21 there is an annular filter element sealing face 6. The holding arms 30 project in relation to the filter element sealing face 6 and/or in relation to the end side 21.

The support arms 30 are substantially L-shaped. Moreover, the holding arms 30 project outwards in the axial direction and in the radial direction in relation to the filter element sealing face 6, wherein the holding arms 30 project radially outwards from the circumferential face 29.

As can likewise be derived from FIG. 5, the holding arms 30 are fixedly connected to the filter element sealing face 6, preferably configured so as to be integral to the filter element sealing face 6.

It is also shown that the holding arms 30 have in each case a support face 47 which points in the opposite direction of the filter element sealing face 6. The support face 47 is convexly curved. The convex curvature of the support surfaces 47 extends in the axial direction to the central axis 18, wherein the support surfaces 47 adjoin the free ends of the holding arms 30 and in the radial direction have a length of at least 2 millimeters and at most 8 millimeters. A length between 3 and 6 millimeters is particularly advantageous. Such dimensions permit the easy removal of the filter element 2 and at the same time offer a sufficient support face 47 as a counterbearing to the receptacle installations 36.

The holding arms 30 have an end face 49 which is situated at the exposed end of the support arms 30 that points radially away from the circumferential face 29 and thus from the central axis 18. The spacing between the center of the filter element sealing face 6 and an end face 49 in the radial direction to the central axis 18 here is between 12 and 18 millimeters. A spacing of between 14 and 16 millimeters between the end faces 49 and the center of the filter element sealing face 6 is particularly advantageous. The spacing between the filter element sealing face 6 and the beginning of the support faces 47 in the axial direction is between 0 and 4 millimeters, preferably between 1 and 2 millimeters.

The filter element 2 is designed in such a manner that substantially only axial forces act on the filter element sealing face 6. The holding arms 30 form a counterbearing 50 in relation to the axial forces that are created as a result of the compression of the sealing member 4 shown in FIG. 1, the latter bearing on the filter element sealing face 6.

Figure 6:
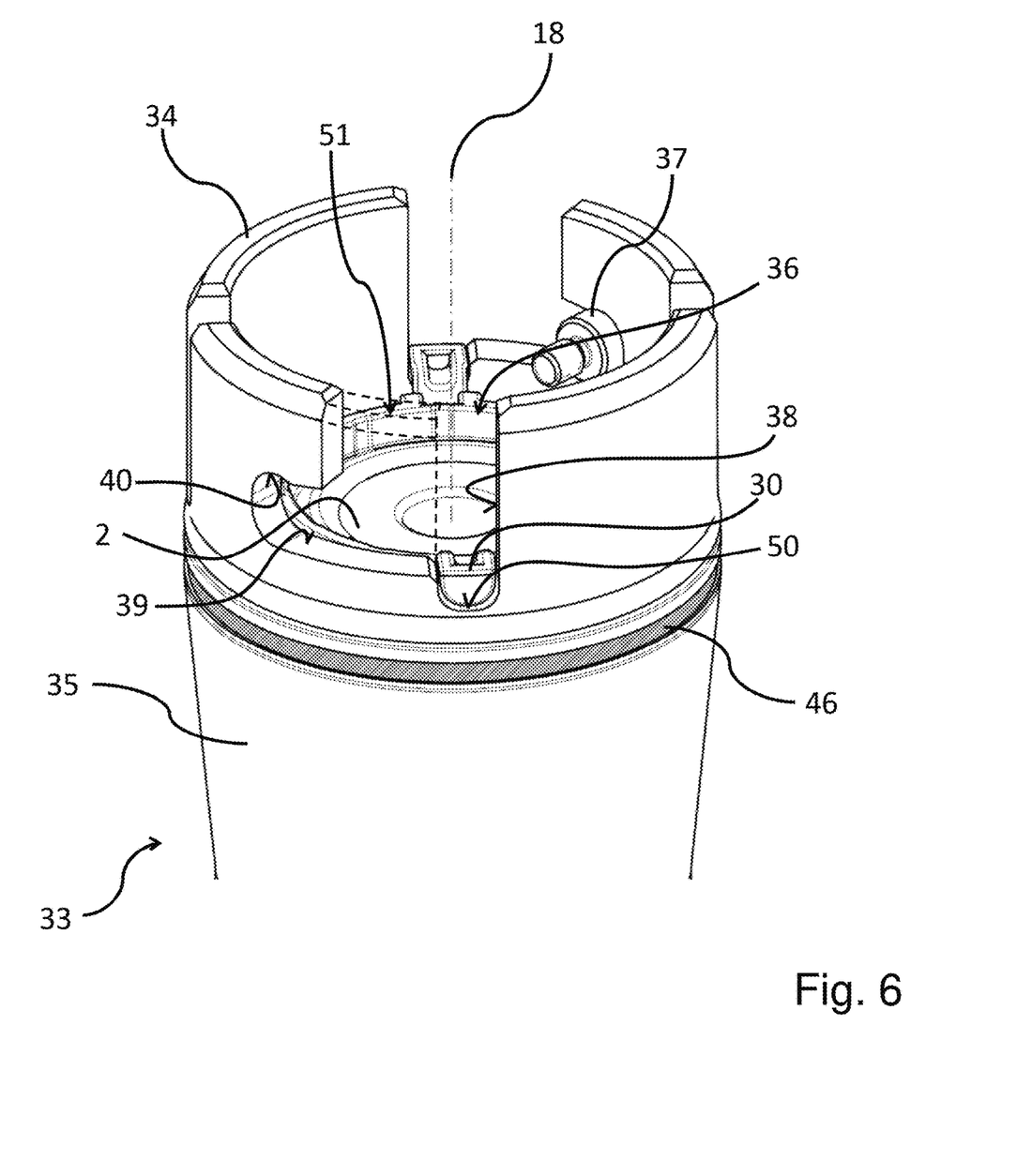
FIG. 6 shows a perspective view of a filter sleeve having a filter element.

It is of particular advantage that the holding arms 30 are flexible in the axial direction and thus form a compensation element between the sealing member 4 bearing on the filter element sealing face 6 and the receptacle installations 36 shown in FIG. 6. The receptacle installations 36 receive the holding arms 30.

The filter element 2 at the transition between the holding arms 30 and the circumferential face 29 has centering ramps 48 which have an angle of between 70° and 5° in relation to the central axis 18 and from the circumferential face 29 extend in the direction of the holding arms 30. It is particularly advantageous if the angle between the circumferential face 29 and the centering ramps 48 is between 20° and 40°. The centering ramps 48 connect the circumferential face 29 and the support faces 47 to one another, wherein the centering ramps 48 serve to center the filter element 2 in the surrounding filter sleeve 33.

FIG. 6 shows a substantially tubular filter sleeve 33 having a filter element 2, wherein the filter sleeve 33 has an open filter sleeve end side 34 that faces the filter head 3 and a filter sleeve outside 35 running along the shell face. The filter sleeve 33 surrounds the filter element 2 and delimits the interior of the filter from the environment. The end side 34 of the filter sleeve has receptacle installations 36 for the holding arms 30, wherein the filter element 2 is in contact with the filter sleeve 33 only by way of the holding arms 30 disposed in the receptacle installations 36 and is otherwise freely suspended in the filter sleeve 33.

The receptacle installations 36 are formed at least by continuous axial incisions 38 which begin at the filter sleeve end side 34 and run radially to the central axis 18, wherein the receptacle installations 36 receive the holding arms 30. The ends of the incisions 38 form counterbearings 50 which are concave in shape to match the convex support faces 47 of the holding arms 30, wherein the counterbearings 50 absorb the compression force which is created as a result of the compression of the sealing member 4.

Figure 8:
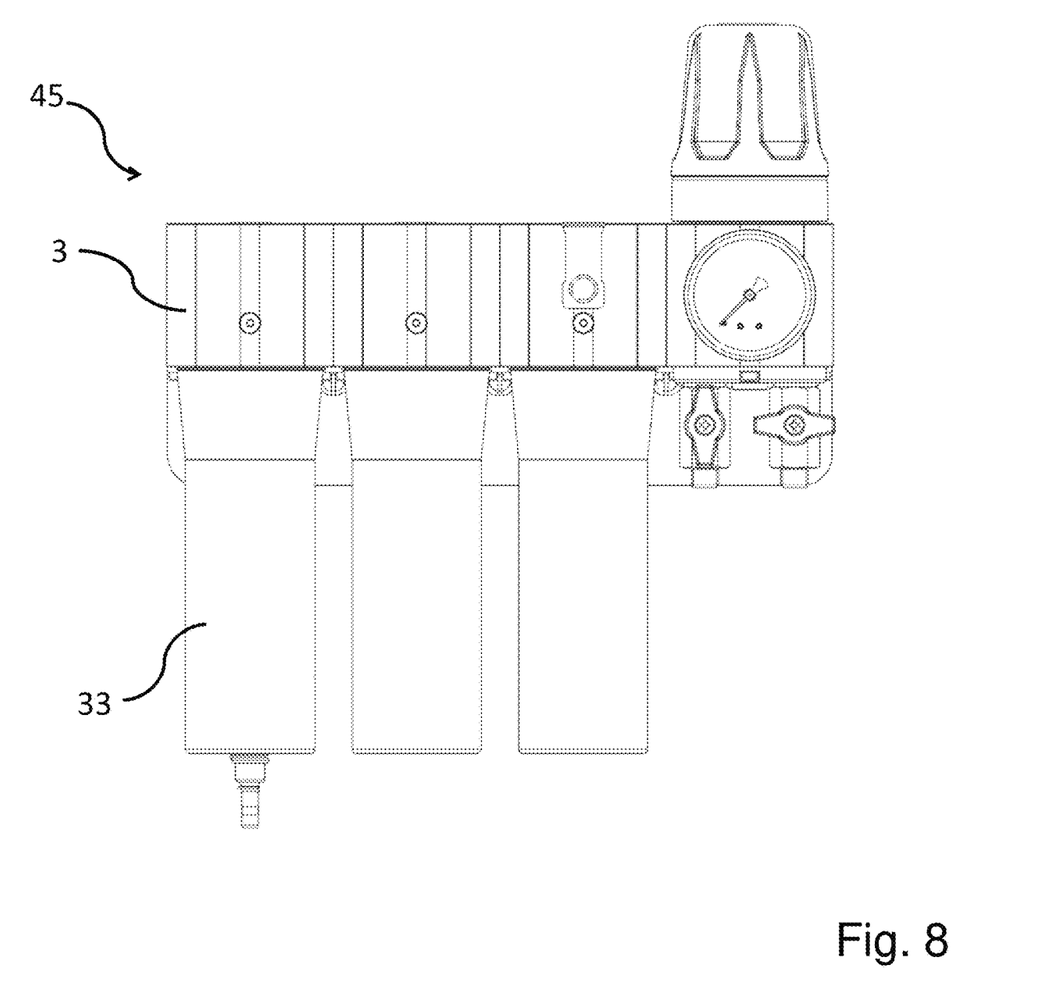
FIG. 8 shows a lateral view of a multi-stage filter.

Two of the receptacle installations 36 are designed as receptacle locking installations 51, which serve to receive the holding arms 30 and the retaining bolts 37 shown in FIG. 8. The retaining bolts 37 are attached to the filter head 3 and aligned radially to the central axis 18. The receptacle locking installations 51 are designed in such a manner that the retaining bolts 37 interact with the receptacle locking devices 51 in the manner of a bayonet closure.

In addition to the axial incisions 38, the receptacle locking installations 51 have a fastening extension 39, wherein the fastening extension 39 is formed by a further incision that starts from the axial incisions 38 and runs substantially in the circumferential direction about parts of the filter sleeve 33. The attachment extension 39 also has a latching undercut 40 which is formed by a concavity in the end region of the attachment extension 39 proximal to the filter head.

Figure 7:
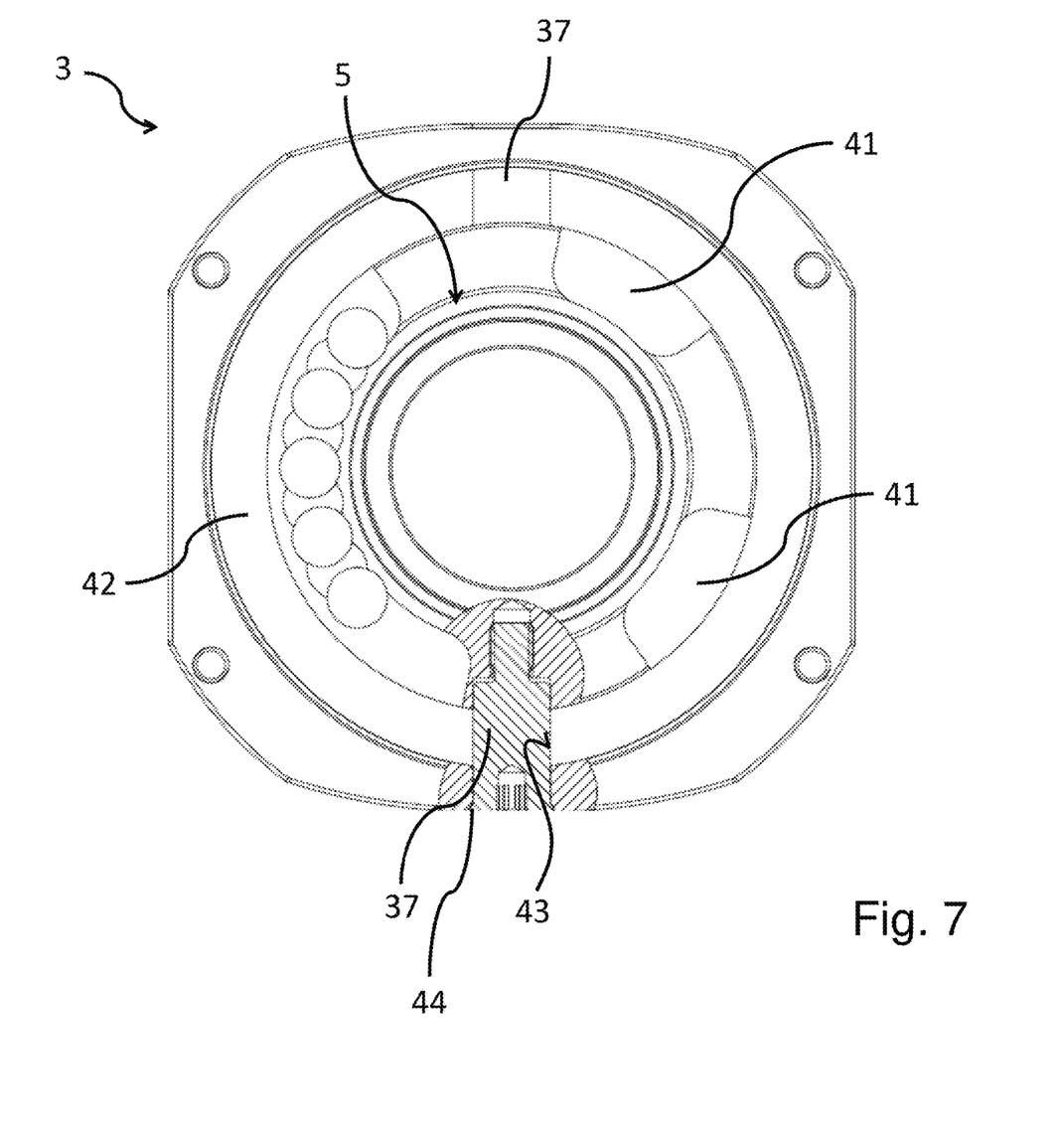
FIG. 7 shows a partial section of a bottom view of a filter head.

Shown from below in FIG. 7 is a filter head 3, wherein the filter sleeve 33 and the filter element 2 are being shown. The filter head 3 has a filter head sealing face 5 on which the sealing member 4 shown in FIGS. 1 to 3 bears. As can be derived from the drawing, holding arm recesses 41 which are set back in relation to the filter head sealing face 5 are provided, wherein the holding arms 30 in the assembled state extend into the holding arm recesses 41.

The filter head 3 also has a hollow-cylindrical filter sleeve end side recess 42, which from the filter head sealing face 5 extends substantially axially symmetrically to the central axis 18 into the filter head 3 and, in the assembled state, receives the filter sleeve end side 34, wherein the filter sleeve end side recess 42 in the radial direction toward the central axis 18 is situated outside the filter head sealing face 5.

The filter head 3 moreover has two retaining bolt bores 43, which run radially to the central axis 18 and are preferably mutually opposite, wherein the retaining bolt bores 43 receive retaining bolts 37 which preferably interact with the receptacle installations 36 in the filter sleeve 33 from FIG. 6 in the manner of a bayonet closure, preferably wherein a metal-on-metal cone seal 44 is provided between the retaining bolts 37 and the filter head 3.

Shown in FIG. 8 is a multi-stage filter 45 as a system having a plurality of filters, or filter stages, respectively, wherein the filter stages, additionally or alternatively to the seal arrangement 1 and/or the filter element 2, comprise features described above. Here, the multi-stage filter 45 comprises, inter alia, filter elements 2 having dissimilar filter properties.

In such a multi-stage filter 45, the seal arrangements 1 for sealing between the filter elements 2 and the filter heads 3 and/or the receptacle installations 36 of the filter sleeves 33 and/or the holding arms 30 of the filter elements 2 can be designed so as to be substantially identical to one another in accordance with the above features. Moreover, at least one of the filter elements 2 can be impinged from the outside with higher pressure than from the inside, wherein at least one of the filter elements 2 is pressurized in reverse.

The invention claimed is:

1. A seal arrangement for a filter for the fluid-tight sealing between a filter element and a filter head, comprising an annular, elastic sealing member, the sealing member being an axially acting seal that seals substantially by way of axially acting forces,
   wherein the sealing member has a filter head side that faces the filter head, an opposite filter element side, an internal face encircling the inside, and an opposite external face encircling the outside,
   wherein the filter head side has an encircling first concavity between the internal face and the external face, and the filter element side has an encircling second concavity between the internal face and the external face,
   wherein a filter head sealing face and a filter element sealing face are provided,
   wherein the filter head side seals at least in regions on the filter head sealing face, and the filter element side seals at least in regions on the filter element sealing face, and
   wherein the filter head sealing face and the filter element sealing face are each composed of at least one encircling inner partial face and one encircling outer partial face.

2. The seal arrangement of claim 1, wherein the partial faces of the filter head sealing face and the partial faces of the filter element sealing face ascend toward the middle between the partial faces in such a manner that the mutual spacing between the inner partial faces decreases from the inside to the outside and the spacing of the outer partial faces decreases from the outside to the inside.

3. The seal arrangement of claim 1, wherein the partial faces interact with the concavities in such a manner that, when impinged with pressure, the sealing member, proceeding from the internal face and/or the external face, in the direction of the acting force is wedged between the inner partial faces and/or the outer partial faces.

4. The seal arrangement of claim 1, wherein the sealing fit between the partial faces and the concavities is reinforced when there is a pressure difference between the internal face and the external face as a result of the interaction between the applied force and the wedge effect.

5. The seal arrangement of claim 1, wherein the sealing member on the filter head side has an encircling retaining groove for receiving a retaining element, wherein the retaining element is designed in such a manner that, when interacting with the retaining groove, a releasable latching connection is created.

6. The seal arrangement of claim 1, wherein the second concavity extends at least over half of the width of the filter element side between the internal face and the external face and/or the first concavity extends at least over half of the width of the filter head side between the internal face and the external face.

7. The seal arrangement of claim 1, wherein the sealing member in an encircling sub-region of the second concavity does not bear on the filter element sealing face.

8. The seal arrangement of claim 5, wherein the retaining element and the retaining groove are designed in such a manner that there is a seal seat between the base of the retaining groove and the region of the retaining element that is closest to the filter element sealing face.

9. The seal arrangement of claim 5, wherein the latching connection is formed by a unilateral extension on the retaining element and a corresponding recess in the sealing member toward a central axis of the sealing member.

10. The seal arrangement of claim 1, wherein the sealing member has a hardness between 60 Shore A and 80 Shore A.

11. The seal arrangement of claim 1, wherein the partial faces of the filter head sealing face and/or of the filter element sealing face in the radial direction toward the central axis are at a mutual internal angle $\alpha$ of less than 180°.

12. The seal arrangement of claim 1, wherein the filter head side of the sealing member has two annular encircling partial sealing faces, between which the retaining groove extends into the sealing member, and both partial sealing faces in the radial direction to the central axis are at an external angle $\alpha_1$ of less than 180°.

13. The seal arrangement of claim 1, wherein in the non-assembled state the second concavity in the direction of the central axis has a greater depth than the extent of the partial faces in the direction of the filter head, wherein the height offset of the partial faces is less than 70% of the depth of the second concavity.

14. The seal arrangement of claim 1, wherein the seal arrangement is configured for use in a filter, the filter element of said filter to the filter head taking place along an assembly axis which runs parallel to, or is identical to, the central axis of the sealing member.

15. The seal arrangement of claim 1, wherein the seal arrangement is embodied in such a manner that the internal face and the external face of the sealing member come to bear neither on the filter head nor on the filter element so that the sealing member only seals axially in relation to a central axis of the sealing member.

16. The seal arrangement of claim 1, wherein the sealing member seals in relation to the filter head sealing face and in relation to the filter element sealing face substantially by way of axially acting forces so as to seal predominantly in the axial direction.

17. A filter element having a seal arrangement for the fluid-tight sealing between the filter element and a filter head, the seal arrangement comprising an annular, elastic sealing member, wherein the sealing member has a filter head side that faces the filter head, an opposite filter element side, an internal face encircling the inside, and an opposite external face encircling the outside,
   wherein the filter head side has an encircling first concavity between the internal face and the external face, and the filter element side has an encircling second concavity between the internal face and the external face,
   wherein a filter head sealing face and a filter element sealing face are provided,
   wherein the filter head side seals at least in regions on the filter head sealing face, and the filter element side seals at least in regions on the filter element sealing face,
   wherein the filter head sealing face and the filter element sealing face are composed of at least one encircling inner partial face and one encircling outer partial face, and
   wherein the filter element sealing face is set back in relation to an end side of the filter element.

18. The filter element of claim 17, wherein the filter element has a substantially tubular body,
   wherein the end side of the filter element is annular and faces a filter head,
   wherein the filter element has an lower side which faces away from the filter head and is spaced apart from the end side, wherein the filter element has a circumferential face which extends along a central axis, with the circumferential face connecting the end side and the lower side to one another, wherein the circumferential face in the region adjoining the end side has a plurality of extensions running radially to the central axis, which form holding arms, wherein the filter element sealing face is set back on the inner diameter of the end side and is likewise annular, and wherein the holding arms project in relation to the end side and the filter element sealing face is designed for contact with a sealing member.

19. The seal arrangement of claim 17, wherein the end side is formed by an encircling collar projecting in relation to the filter element sealing face.

20. A filter element having a seal arrangement for the fluid-tight sealing between the filter element and a filter head, the seal arrangement comprising an annular, elastic sealing member, wherein the sealing member has a filter head side that faces the filter head, an opposite filter element side, an internal face encircling the inside, and an opposite external face encircling the outside, wherein the filter head side has an encircling first concavity between the internal face and the external face, and the filter element side has an encircling second concavity between the internal face and the external face, wherein a filter head sealing face and a filter element sealing face are provided, wherein the filter head side seals at least in regions on the filter head sealing face, and the filter element side seals at least in regions on the filter element sealing face, wherein the filter head sealing face and the filter element sealing face are composed of at least one encircling inner partial face and one encircling outer partial face, and wherein an end side of the filter element is formed by an encircling collar projecting in relation to the filter element sealing face.

* * * * *